United States Patent
Birman et al.

(10) Patent No.: US 8,261,686 B2
(45) Date of Patent: Sep. 11, 2012

(54) FLOOD ILLUMINATED CLUSTER WITH TELLTALES

(75) Inventors: Vyacheslav B. Birman, Auburn Hills, MI (US); Yang Yang, Macomb Township, MI (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 739 days.

(21) Appl. No.: 12/212,024

(22) Filed: Sep. 17, 2008

(65) Prior Publication Data

US 2010/0064962 A1 Mar. 18, 2010

(51) Int. Cl.
*G12B 11/00* (2006.01)

(52) U.S. Cl. .................. 116/286; 116/305; 362/30

(58) Field of Classification Search .......... 116/286–287, 116/305, 334, DIG. 36; 362/26–30, 85
See application file for complete search history.

(56) References Cited

U.S. PATENT DOCUMENTS

| | | | | |
|---|---|---|---|---|
| 3,699,915 A * | 10/1972 | Greene | ............. | 362/26 |
| 4,841,155 A * | 6/1989 | Ushida et al. | ............. | 250/463.1 |
| 5,546,888 A * | 8/1996 | Skiver et al. | ............. | 116/286 |
| 6,025,820 A * | 2/2000 | Salmon et al. | ............. | 345/75.1 |
| 6,032,608 A * | 3/2000 | Oreans et al. | ............. | 116/288 |
| 6,302,552 B1 * | 10/2001 | Ross et al. | ............. | 362/30 |
| 6,334,688 B1 * | 1/2002 | Niwa | ............. | 362/26 |
| 6,511,194 B1 * | 1/2003 | Noll et al. | ............. | 362/23 |
| 6,595,667 B1 * | 7/2003 | Obata | ............. | 362/489 |
| D491,504 S * | 6/2004 | Sato et al. | ............. | D12/192 |
| D491,853 S * | 6/2004 | Sato et al. | ............. | D12/192 |
| 6,817,310 B2 * | 11/2004 | Sugiyama et al. | ............. | 116/62.4 |
| 6,915,758 B2 * | 7/2005 | Nakagawa et al. | ............. | 116/286 |
| 6,959,995 B2 * | 11/2005 | Ikarashi et al. | ............. | 362/23 |
| 6,981,464 B2 * | 1/2006 | Birman et al. | ............. | 116/288 |
| 7,066,630 B1 * | 6/2006 | Venkatram | ............. | 362/489 |
| 7,093,948 B2 * | 8/2006 | Fong et al. | ............. | 362/30 |
| 7,216,997 B2 * | 5/2007 | Anderson, Jr. | ............. | 362/27 |
| 7,270,434 B2 * | 9/2007 | Obata et al. | ............. | 362/23 |
| 7,404,374 B2 * | 7/2008 | Kato | ............. | 116/286 |
| 7,458,695 B2 * | 12/2008 | Birman et al. | ............. | 362/26 |
| 7,475,999 B2 * | 1/2009 | Mezouari | ............. | 362/26 |
| 7,506,996 B2 * | 3/2009 | Birman et al. | ............. | 362/236 |
| 7,575,331 B2 * | 8/2009 | Birman et al. | ............. | 362/27 |
| 7,591,562 B2 * | 9/2009 | Birman et al. | ............. | 362/23 |
| 7,607,808 B2 * | 10/2009 | Birman et al. | ............. | 362/489 |
| 7,637,623 B2 * | 12/2009 | Wang et al. | ............. | 362/30 |
| 2002/0135994 A1 * | 9/2002 | Ikarashi et al. | ............. | 362/23 |
| 2003/0121467 A1 * | 7/2003 | Furuya | ............. | 116/286 |

(Continued)

FOREIGN PATENT DOCUMENTS

GB 2437548 10/2007
WO 2008/045583 4/2008

OTHER PUBLICATIONS

International Search Report and Written Opinion mailed on May 27, 2009.
International Preliminary Report on Patentability mailed on Mar. 31, 2011 for PCT Application No. PCT/US2008/076636.

*Primary Examiner* — R. A. Smith
*Assistant Examiner* — Tania Courson

(57) ABSTRACT

An illuminated gauge assembly includes a top surface of a light housing that includes a scale and a light guide that extends through the light housing for distributing light onto the surface of the top surface. A single light source is disposed below the light housing and directs through the light guide onto the top surface of the light housing.

20 Claims, 5 Drawing Sheets

U.S. PATENT DOCUMENTS

| | | |
|---|---|---|
| 2006/0087826 A1 | 4/2006 | Anderson, Jr. |
| 2006/0126320 A1* | 6/2006 | Fong et al. ...................... 362/27 |
| 2007/0157869 A1* | 7/2007 | Takato .......................... 116/286 |
| 2009/0316382 A1* | 12/2009 | Birman et al. .................. 362/23 |

* cited by examiner

FLOOD ILLUMINATED CLUSTER WITH TELLTALES

BACKGROUND OF THE INVENTION

This invention generally relates to a vehicle instrument cluster. More particularly, this invention relates to an instrument cluster including an illuminatable gauge.

A vehicle instrument panel includes a plurality of gauges for providing a visual representation of a vehicle performance parameter. The gauge is often lit to provide a desired appearance and provide visibility in a darkened environment. The size of the gauge necessitates the use of several light sources arranged about the gauge to provide the desired light uniformity about the entire gauge. Of course each light source adds cost and complexity to the gauge.

Accordingly, it is desirable to design and develop an illuminated gauge assembly that provides the desired light uniformity with a minimal number of light sources.

SUMMARY OF THE INVENTION

A disclosed example of an illuminated gauge assembly includes a top surface of a light housing that includes a scale and a light guide that extends through the light housing for distributing light onto the top surface of the light housing. A single light source is disposed below the light housing and directs light through the light guide onto the dial face assembly.

The light housing includes a dish shape that curves upwardly away from the light guide. The light guide includes a reflective surface that distributes light onto the top surface. A pointer assembly includes a hub that covers a terminal end of the light guide for blocking light coming directly through the light guide.

These and other features of the present invention can be best understood from the following specification and drawings, the following of which is a brief description.

DETAILED DESCRIPTION OF THE PREFERRED EMBODIMENT

Figure 1:
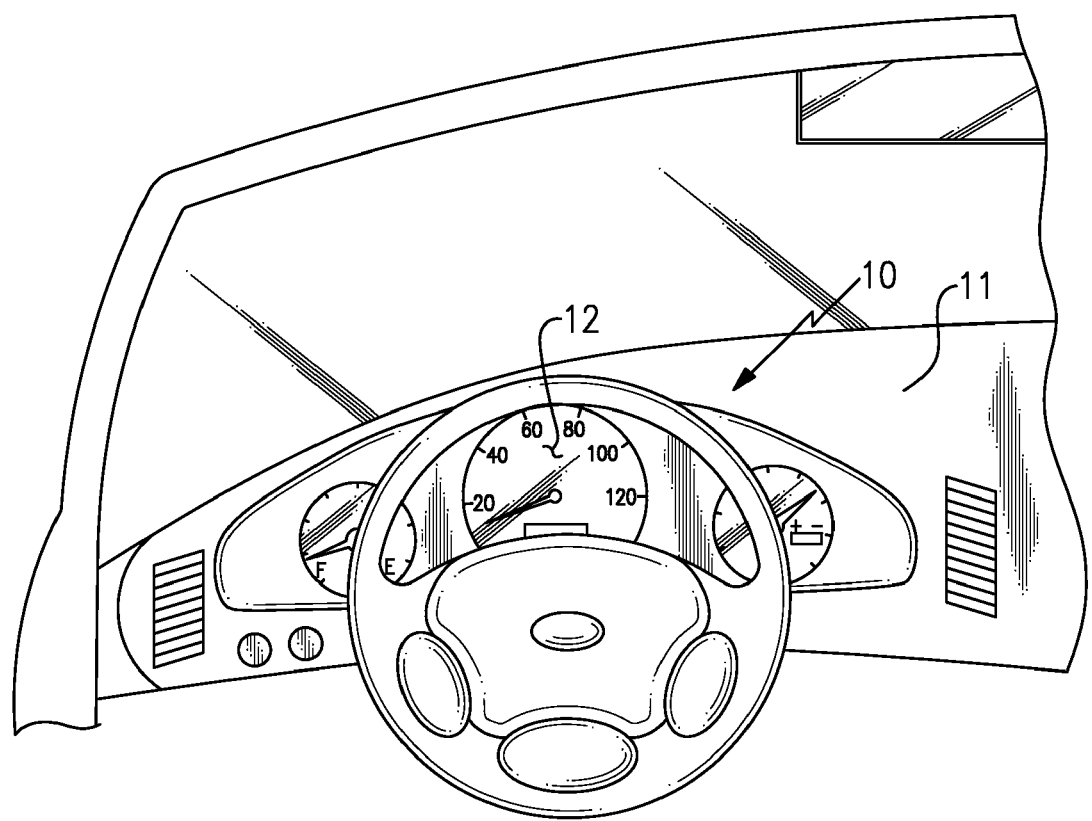
FIG. 1 is a front view of an example instrument cluster.

Referring to FIG. 1, an instrument cluster assembly 10 is disposed within a vehicle dashboard 11 and includes at least one gauge assembly 12. The gauge assembly 12 includes a pointer and a series of graphical indicators to indicate a vehicle operating parameter. The example gauge assembly provides an indication of vehicle speed, and may also comprise a tachometer, a temperature gage, a fuel gauge, or any other gauge utilized to communicate a vehicle operating parameter to an operator.

Figure 2:
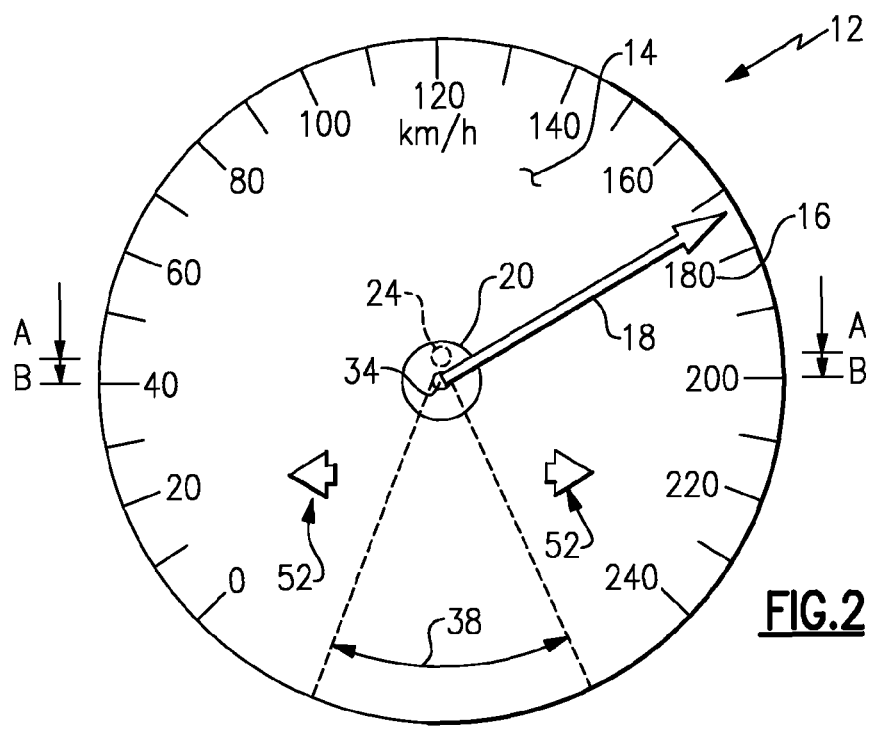
FIG. 2 is a front view of an example gauge.

Referring to FIG. 2, the gauge assembly 12 includes a top surface 14 that has a scale 16. The example scale 16 comprises reference numerals and graphic symbols applied to the top surface 14. The example scale 16 provides an indication of the speed of the vehicle. Further, the example scale 16 is printed on the top surface 14 of the gauge assembly 12, but may also be generated and applied using other known methods. A pointer 18 is rotatable relative to the top surface 14 to indicate a current value of the measured vehicle parameter. The pointer includes a hub portion 20 that covers a terminal end of a light guide 24 that extends through the top surface 14. The end of the light guide 24 is disposed in the space between the hub portion 20 and the top surface 14 of the light guide 24.

Figure 3:
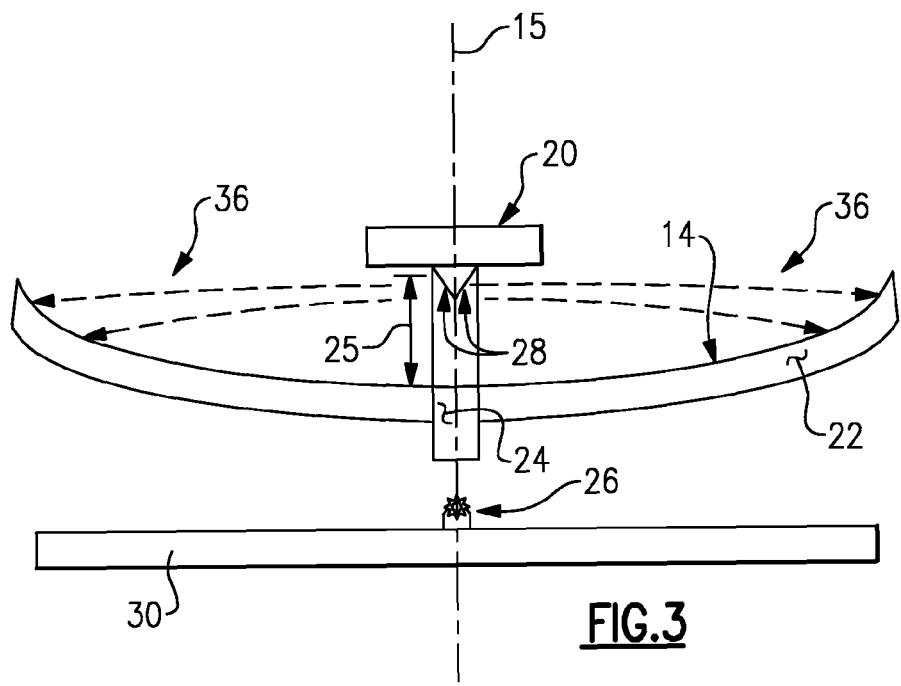
FIG. 3 is a cross-sectional view of an example illuminated gauge.
Figure 4:
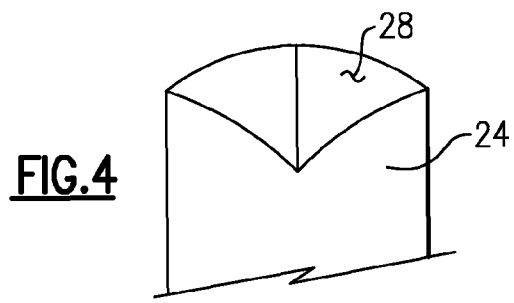
FIG. 4 is an enlarged view of a light guide for the example gauge.
Figure 5:
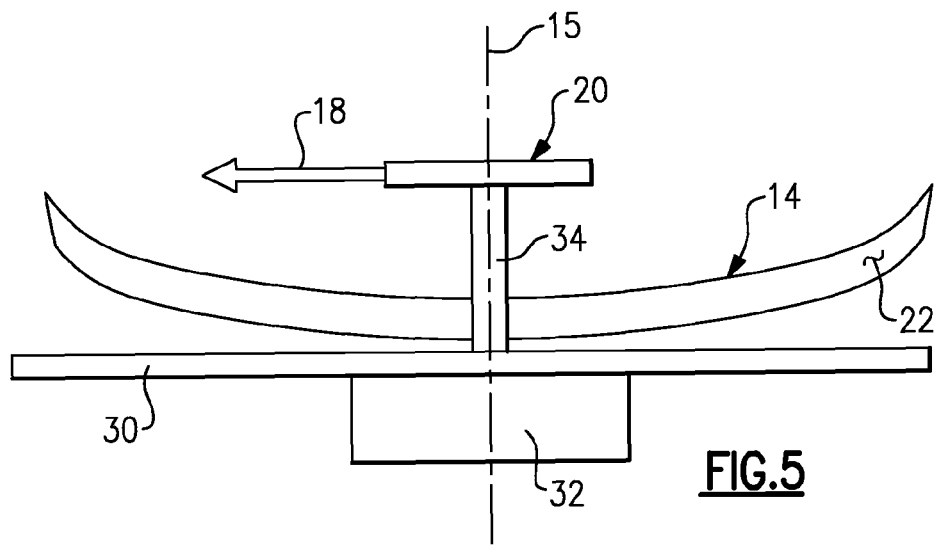
FIG. 5 is another cross-sectional view of the example illuminated gauge illustrated in FIG. 3.

Referring to FIGS. 3, 4 and 5, with continued reference to FIG. 2, the gauge assembly 12 includes the top surface 14 and light guide 24 that extends upwardly through the top surface 14. A single primary light-emitting diode (LED) 26 is mounted on a printed circuit board 30 proximate one end of the light guide 24. Although the example primary light source comprises an LED, other light sources as are known are also within the contemplation of this invention. Light emitted by the light source 26 travels through the light guide 24 and reflects off reflective surfaces 28. Light reflected off the reflective surfaces 28 is directed towards the outer perimeter of the top surface 14. Light 36 emitted from the light guide 24 uniformly illuminates the top surface 14, except for a shaded region 38 blocked by shaft 34 of the pointer 18.

The shaft 34 of the pointer 18 is by necessity disposed along an axis 15 centered on the top surface 14 relative to the scale 16. The example primary light guide 24 is positioned above the shaft 34 in an upper portion of the top surface 14. The example position of the primary light guide 24 provides for light 36 to light substantially the entire upper top surface 14. The shaded portion 38 where light is blocked by the shaft 34 is not typically utilized for the scale 16.

The example pointer 18 can be non-illuminated and molded in a solid color as the top surface 14 is a light reflective color providing very good contrast and visibility. The example pointer 18 can also be illuminated to provide a desired aesthetic appearance.

Figure 6:
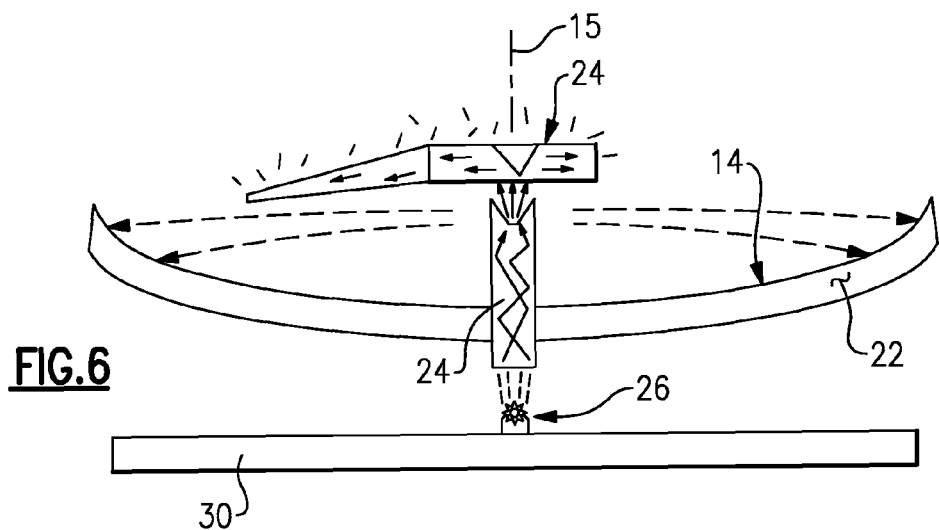
FIG. 6 is a schematic view of an example illuminated pointer.

Referring to FIG. 6, another example pointer 25 is illuminated utilizing light from the primary light guide 24. The example pointer 25 is molded from a clear plastic and mixed with a phosphor material. The resulting reflection of light illuminates the pointer 25 to provide a desired appearance. The pointer 25 may also include a luminescent paint or coating on a rear surface to provide the desired reflective properties within the pointer 25.

The color of the example pointer 25 can be provided by use of specific colors of phosphor material or luminescent paint. The illumination of the pointer is best provided by having as a dominate wave length of the gauge illumination that is shorter than the pointer illumination.

Referring back to FIGS. 2-5, the example top surface 14 is disposed on light housing 22. The example light housing 22 is generally concave shaped beginning with a low point in the center where the pointer shaft 34 and primary light guide 24 are disposed and curves upwardly in a direction away from the pointer shaft 34. The concave shape of the light housing 22 provides a desired shape that corresponds with the reflective surfaces of the light guide 24 to substantially distribute light 36 uniformly toward a periphery of the gauge assembly 12.

The specific concave shape of the light housing 22 is formed in relation to the position of the light guide 24. The height 25 of the terminal end of the light guide 24 corresponds with the curvature of the light housing 22 and overall distance from the center of the light housing 22 to provide the desired illumination of the top surface 14. The height 25 of the light guide may be tailored to each gauge assembly or may be of a set length for use with different gauge assemblies. A common length for the production of a single primary light guide that is applicable across many different gauge assemblies. The desired portions of the top surface 14 corresponding to the scale 16 are illuminated by the single primary light source 26 by way of the light guide extending above the dial face surface. Additionally, the reflective surface 28 is disposed at an angle relative to the axis 15 determined to most efficiently direct light to the outer periphery of the top surface 14.

Figure 7:
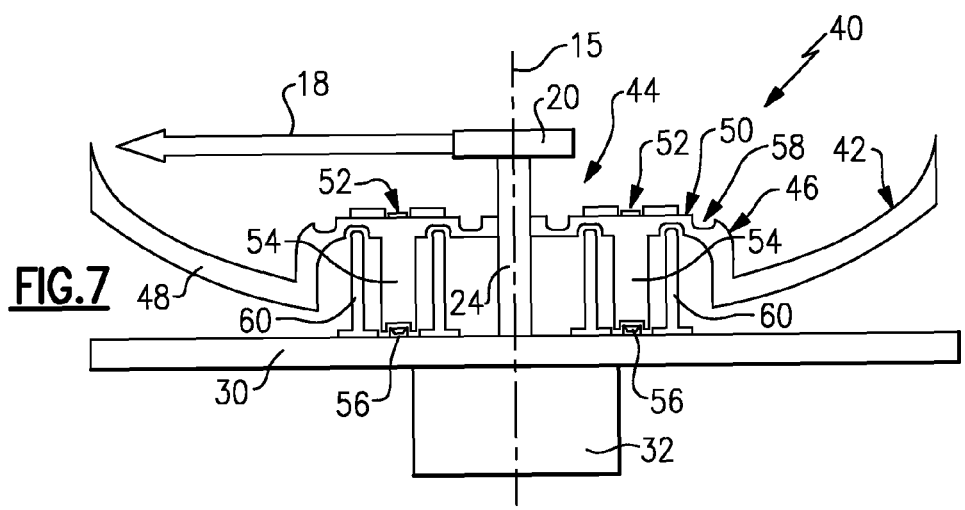
FIG. 7 is a cross-sectional view of another example gauge assembly.
Figure 8:
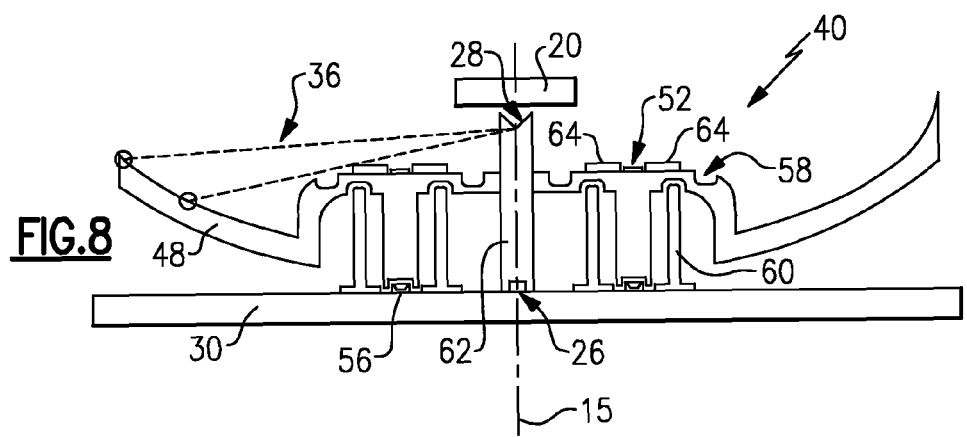
FIG. 8 is another cross-sectional view of the example gauge assembly of FIG. 7.

Referring to FIGS. 7 and 8, another gauge assembly 40 includes a light housing 48 having a dish portion 42 that extends radially outward from a center portion 44. The center portion 44 is raised relative to the surface of the dish portion 42 and includes a flat surface 50 for a telltale 52. The telltale 52 is a term that refers to selectively illuminated features visible within the gauge assembly 12. In the disclosed example, the telltale features 52 correspond to turn signal indicators that are disposed within the top surface 14 (Best shown in FIG. 2). As appreciated, other telltale features could be utilized and included in the center portion 44 of the example gauge assembly 40.

The example light housing 48 includes the center portion 44 with the dish portion 42 extending therefrom. The shape of the light housing 48 includes the flat surface 50 of the center portion 44 and then proceeds down a negative slope portion 46 that precedes downwardly that transitions to a positively sloped portion that forms the dish 42. The dish portion 42 includes the scale 16 as was previously described in reference to the example gauge 12.

The center portion 44 of the gauge assembly 40 includes secondary light guides 54 that correspond with secondary light sources 56 that are mounted on a printed circuit board 30. The secondary light sources 56 are selectively illuminatable to direct light through the secondary light guides 54 to illuminate the corresponding telltale 52. In this example, the light sources 56 are illuminatable to indicate and flash a turn signal indicator. Further, in this example the secondary light guides 54 are disposed on different sides of the pointer shaft 34, however, the secondary light guides 54 can be positioned according to the desired position of the corresponding tell tale 52. Further, although two tell tales 52 are shown in the illustrate example, any number of tell tales 52 could be utilized, each with a corresponding light guide 54 and light source 56.

The dish portion 42 and the center portion 44 are one single continuous structure comprised of a substantially transparent material. The secondary light guides 54 are an integral part of the center portion 44. The transparent characteristics of the center portion 44 provide for the transmission of light from the secondary light sources 56 up to the corresponding telltales 52. The transparent nature of the secondary light guides 54 require a light block 60 that surrounds the light guides 54 for controlling light emission. The light block 60 prevents light from the secondary light guides 54 and light sources 56 from encroaching into undesired areas of the portions of the light housing 48. The example light block 60 is a one piece sleeve that surrounds the light guide 54 and fits within a groove 58. the example light block 60 is fabricated from a rubber material to provide some flexibility to accommodate stack up tolerances and to provide the desired light blocking capability. Other materials could also be utilized that provide the desired light blocking capability.

Light emission is controlled by grooves 58 in the light housing 48. The grooves 58 are provided on the upper flat surface 50 and also in correspond with the light block 60 that is disposed between the printed circuit board 30 and a bottom surface of the light housing 40.

Illumination of the dish portion 42 is provided by light reflected by the reflective surfaces 28 of the primary light source 26 through the primary light guide 62. The terminal end of the light guide 62 extends above the center portion 44 and is covered from the perspective of an operator viewing the gauge assembly 40 by the hub 20 of the pointer 18. The substantially central location of the light guide 62 provides for the desired disbursal of light 36 across the gauge assembly 40.

Figure 9:
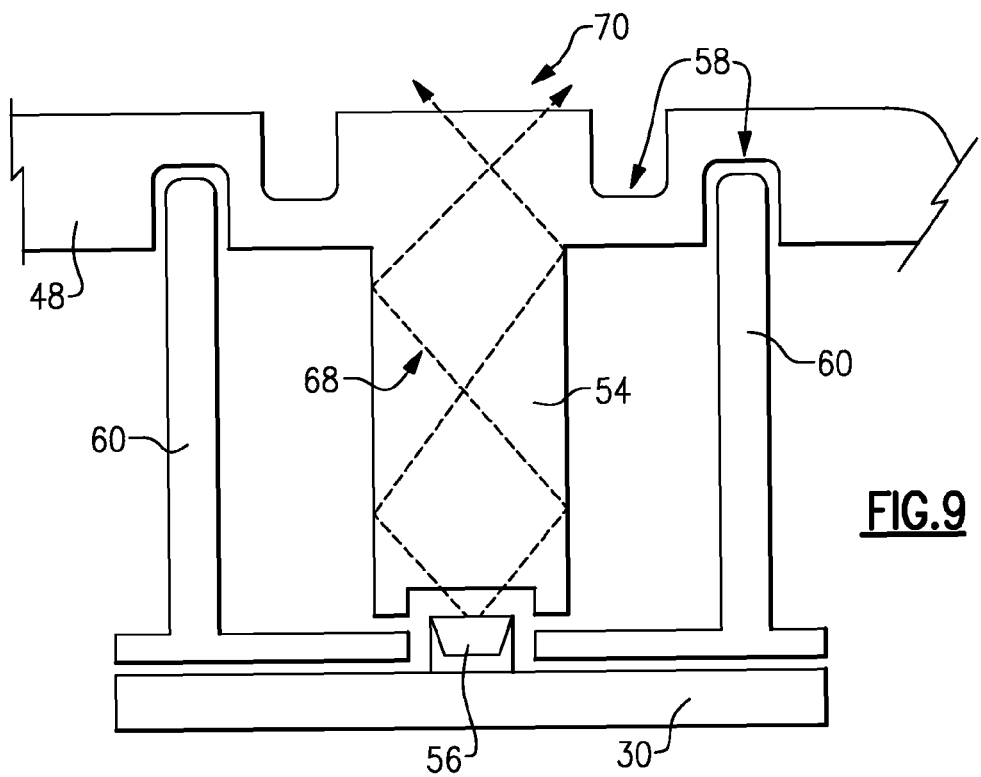
FIG. 9 is cross-sectional view of a tell tale portion of the example gauge assembly of FIG. 6.

Referring to FIG. 9, an enlarged view of the secondary light guide 54 illustrates light 68 from the secondary light source 56 being transmitting and reflected through the secondary light guide 54 to exit a surface 70 corresponding to the telltale 52. The light block 60 extends into grooves 58 disposed on a bottom surface of the light housing 48. The example grooves 58 provide a barrier that prevents the undesired reflection or transmission of light through the transparent light housing 48.

Figure 10:
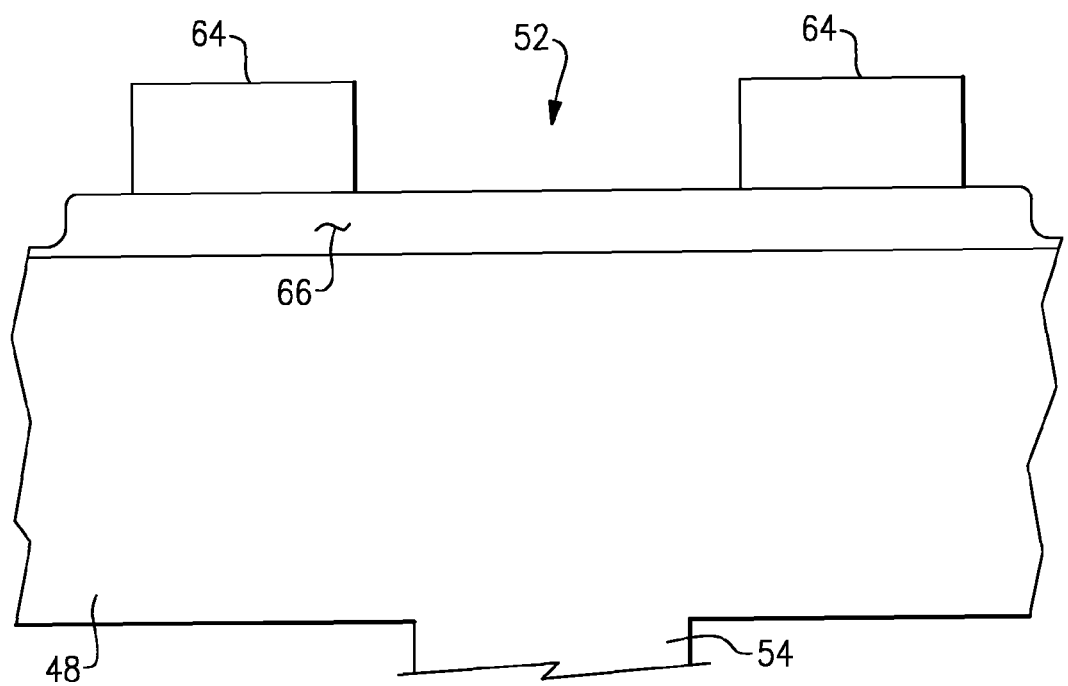
FIG. 10 is another cross-sectional view through the tell tale portion of the example gauge assembly of FIG. 6.

Referring to FIG. 10, an enlarged sectional view through the tell tale 52 in the central portion 44 illustrates the transparent material that comprises the light housing 48. Light is not emitted through the entire light housing and therefore a coating layer 66 is applied that is semi-transparent to present a blacked out appearance in a non-illuminated condition and an illuminated appearance when the secondary light source is lit. provides for the reflection of light from the surface. Further, a mask layer 64 is applied over the coating 66 to prevent the transmission of light in specific desired area. In this instance light is blocked from around the tell tale 52 to better highlight the tell tale when illuminated.

Figure 11:
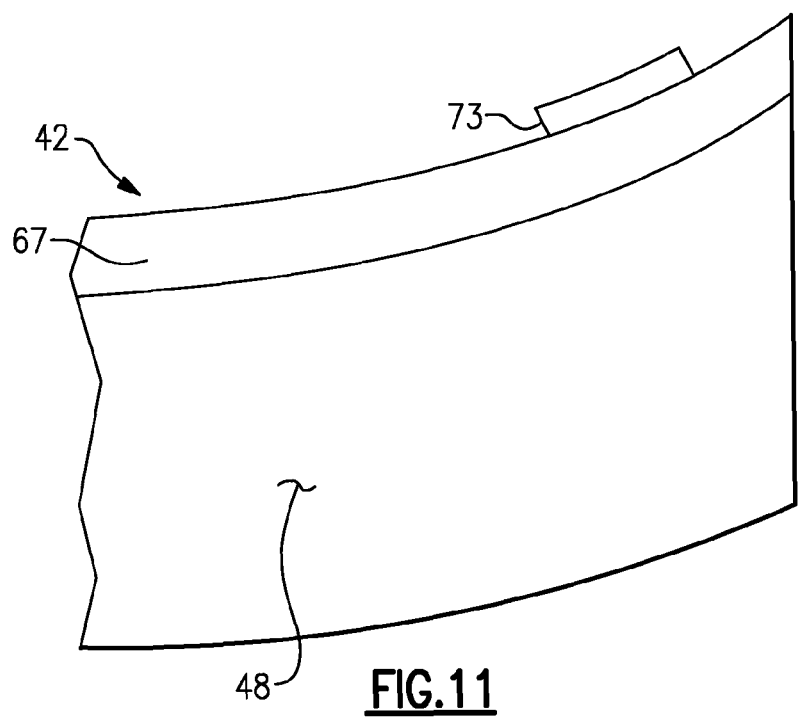
FIG. 11 is a cross-sectional view through a dish portion of the example gauge assembly.

Referring to FIG. 11, the dish portion 42 of the light housing 48 includes the coating 67 that provides a reflective surface to aid in illuminating the gauge assembly 40 with the single primary light guide 62. The reflective nature of the coating 67 reflects and spreads light provided from the primary light guide 62. Also provided on top of the coating 67 is a portion of the graphic 72 that is utilized to create the scale 16 referenced by the pointer 18.

Accordingly, the example illuminated gauge assembly provides for the substantially uniform illumination of the dial gauge assembly with a single LED. Further, the example gauge assembly provides additional features that correspond and provide for the illumination of telltales with integrally formed secondary light guides.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:
1. A gauge assembly comprising:
a light housing;
graphics disposed on top surface of the light housing representing a vehicle parameter;
a single primary light guide disposed along an axis and extending through the light housing, the light guide including a reflective surface; and a single light source disposed below the light housing and coaxial with the single primary light guide, the single light source directing light through the single primary light guide and onto the graphics printed on the top surface, wherein the single light source provides all light utilized for illuminating the top surface.

2. The assembly as recited in claim 1, including a pointer rotatable about an axis, wherein the single light guide is disposed above the axis and a shaft of the pointer.

3. The assembly as recited in claim 2, wherein the top surface includes a first portion disposed on a first side of the axis of rotation of the pointer and a second portion disposed on a second side of the axis of rotation of the pointer, the single primary light guide disposed within the first portion.

4. The assembly as recited in claim 2, wherein the pointer includes a hub disposed about the axis of rotation and the single primary light guide is disposed within the outer periphery of the hub.

5. The assembly as recited in claim 1, wherein the light housing comprises a dish shaped portion with a center portion raised relative to the dish shaped portion.

6. The assembly as recited in claim 1, wherein the pointer comprises a clear material with phosphor for generating a desired illuminated appearance.

7. The assembly as recited in claim 1, wherein the single light source comprises a light emitting diode mounted to a printed circuit board.

8. A gauge assembly comprising:
a light housing;
graphics disposed on top surface of the light housing representing a vehicle parameter;
a single primary light guide extending through the light housing, the light guide including a reflective surface; and
a single light source disposed below the light housing directing light through the single primary light guide and onto the graphics printed on the top surface, wherein the single light source provides all light utilized for illuminating the top surface, wherein the light housing comprises a dish shaped portion with a center portion raised relative to the dish shaped portion and the center portion includes at least one illuminatable symbol.

9. The assembly as recited in claim 8, wherein the center portion includes at least one secondary light guide for communicating light from a secondary light source for illuminating a corresponding one of the at least one illuminatable symbol.

10. The assembly as recited in claim 9, including a light block disposed about each of the at least one secondary light guides for controlling light emission.

11. The assembly as recited in claim 9, including a groove disposed at least partially around the at least one illuminatable symbol for controlling light transmission from the secondary light guide.

12. An instrument panel assembly comprising
a light housing including a positively curved surface including a scale;
a single primary light guide disposed along an axis and extending through the light housing;
a single primary light source disposed below the light housing and coaxial with the single primary light guide for communicating light through the single primary light guide and onto the scale; and
a pointer rotatable about the axis for indicating a portion of the scale, wherein only the single primary light guide and the single primary light guide direct light onto the curved surface including the scale.

13. The assembly as recited in claim 12, wherein the pointer includes a hub portion that covers an end portion of the single primary light guide.

14. The assembly as recited in claim 12, wherein the pointer is illuminatable from light communicated through the primary light guide.

15. The assembly as recited in claim 12, wherein the pointer comprises a clear material with phosphor for generating a desired illuminated appearance.

16. The assembly as recited in claim 12, wherein the single primary light guide includes a reflective surface for directing light from the primary light source onto the curved surface and the scale.

17. An instrument panel assembly comprising
a light housing including a positively curved surface including a scale;
a single primary light guide extending through the light housing;
a single primary light source disposed below the light housing for communicating light through the single primary light guide and onto the scale; and
a pointer rotatable about an axis of rotation for indicating a portion of the scale, wherein only the single primary light guide and the single primary light guide direct light onto the curved surface including the scale, wherein the single primary light housing includes a flat center portion from which the positively curved surface extends.

18. The assembly as recited in claim 17, wherein the center portion includes at least one secondary light guide and a telltale illuminatable by light from the secondary light guide.

19. The assembly as recited in claim 18, including a light block surrounding the secondary light guide for controlling light leakage.

20. The assembly as recited in claim 18, including at least one groove within the light housing disposed at least partially around the telltale for controlling light leakage through the light housing.

* * * * *